(12) United States Patent
Parker

(10) Patent No.: US 12,124,915 B2
(45) Date of Patent: Oct. 22, 2024

(54) DIGITAL TAG TRACKING SYSTEM

(71) Applicant: Harold Parker, Madison, AL (US)

(72) Inventor: Harold Parker, Madison, AL (US)

( * ) Notice: Subject to any disclaimer, the term of this patent is extended or adjusted under 35 U.S.C. 154(b) by 0 days.

(21) Appl. No.: 18/469,988

(22) Filed: Sep. 19, 2023

(65) Prior Publication Data

US 2024/0232552 A1  Jul. 11, 2024

Related U.S. Application Data

(60) Provisional application No. 63/438,154, filed on Jan. 10, 2023.

(51) Int. Cl.
*G06K 7/10* (2006.01)

(52) U.S. Cl.
CPC .............................. *G06K 7/10366* (2013.01)

(58) Field of Classification Search
CPC ................. G06K 7/10366; G06K 7/00; G06K 19/07749; G06K 19/07769; G06K 19/077
USPC .......................... 235/451, 439, 435, 383, 385
See application file for complete search history.

(56) References Cited

U.S. PATENT DOCUMENTS

| | | | |
|---|---|---|---|
| 6,404,327 B1 | 6/2002 | Naddeo | |
| 7,161,563 B2 | 1/2007 | Vitale et al. | |
| 7,551,088 B2 * | 6/2009 | Findlay | G06K 19/07749 235/383 |
| 7,913,908 B2 | 3/2011 | Gelbman | |
| 8,937,559 B2 | 1/2015 | Ioli | |
| 2004/0263357 A1 * | 12/2004 | Hamilton | G08G 1/01 340/936 |
| 2011/0078933 A1 * | 4/2011 | Lukawitz | B60Q 1/545 713/168 |
| 2011/0228391 A1 * | 9/2011 | Bacon, Jr. | G02B 5/128 359/529 |
| 2012/0044429 A1 * | 2/2012 | Guerra | F16M 11/041 348/837 |
| 2015/0039365 A1 | 2/2015 | Haque | |
| 2015/0060551 A1 * | 3/2015 | Fleming | G06V 20/62 40/208 |
| 2017/0194133 A1 * | 7/2017 | Lieberer | H05B 3/0047 |
| 2017/0293832 A1 * | 10/2017 | Pai | G06K 19/07758 |
| 2018/0158384 A1 * | 6/2018 | Butler | H05K 5/0213 |
| 2018/0186309 A1 * | 7/2018 | Batten | B60Q 1/543 |
| 2019/0174279 A1 * | 6/2019 | Verma | G07B 15/063 |

* cited by examiner

*Primary Examiner* — Edwyn Labaze
(74) *Attorney, Agent, or Firm* — Boudwin Intellectual Property Law, LLC; Daniel Boudwin

(57) ABSTRACT

A digital tag tracking system that will save time for drivers, cut DMV costs for producing materials, and enable easy communication and collaboration between law enforcement to quickly find traffic violators helping to avoid high-speed chases and potentially dangerous traffic stops. The digital license plate includes an encasement, an electrophoretic display, a front covering, an electrical power source, a plurality of RFID tags, a GPS receiver, a centralized tracking system, and a plurality of security features. The digital license plate includes driver profile information transmitted and queried based on tracking systems installed within the digital license plate utilizing the RFID tags and the GPS receiver.

16 Claims, 11 Drawing Sheets

DIGITAL TAG TRACKING SYSTEM

CROSS REFERENCE TO RELATED APPLICATIONS

This application claims the benefit of U.S. Provisional Application No. 63/438,154 filed on Jan. 10, 2023. The above identified patent application is herein incorporated by reference in its entirety to provide continuity of disclosure.

BACKGROUND OF THE INVENTION

The present invention relates to a tracking system. More particularly, the present invention relates to a digital tag tracking system.

Having a valid license plate and current vehicle registration tags are a necessity for every vehicle owner. Unfortunately, the time required to be spent at the Department of Motor Vehicles or DMV may be very time consuming, causing individuals to take time away from work and family life. Law enforcement also relies on up-to-date vehicle registration data to quickly identify motor vehicles and their drivers.

Although many aspects of vehicle registration renewal have become digitized, there is still a waiting period for drivers to receive valid license plates and tags due to necessary production time for metal license plates and sticker decals. Additionally, vehicle registration information within law enforcement databases is not always instantly updated which may create difficulties for law enforcement to identify motor vehicles quickly and easily during traffic stops.

In light of the disadvantages and shortcomings of the known methods and systems, there is a defined need for a solution to these problems. The digital tag tracking system will save time for drivers, cut DMV costs for producing materials, and enable easy communication and collaboration between law enforcement to quickly find traffic violators helping to avoid high-speed chases and potentially dangerous traffic stops.

SUMMARY OF THE INVENTION

In view of the foregoing disadvantages inherent in the known types of digital tag tracking system now present in the prior art, the present invention provides a digital tag tracking system wherein the same may be utilized for providing added convenience for a user when using a digital tag tracking system.

The present invention comprises a server system with a processor system, a communications interface, a communications system, an input system and an output system, the server system having access to a communications network, a memory system with an operating system, a communications module, a web browser module, a web server application, and a non-transitory storage media for a digital tag tracking system, the memory system is in communication with the server system through the communications network, and a digital license plate in operable communication with the server system, wherein the server system stores a plurality of driver profile information that resides on the non-transitory storage media for a digital tag tracking system.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
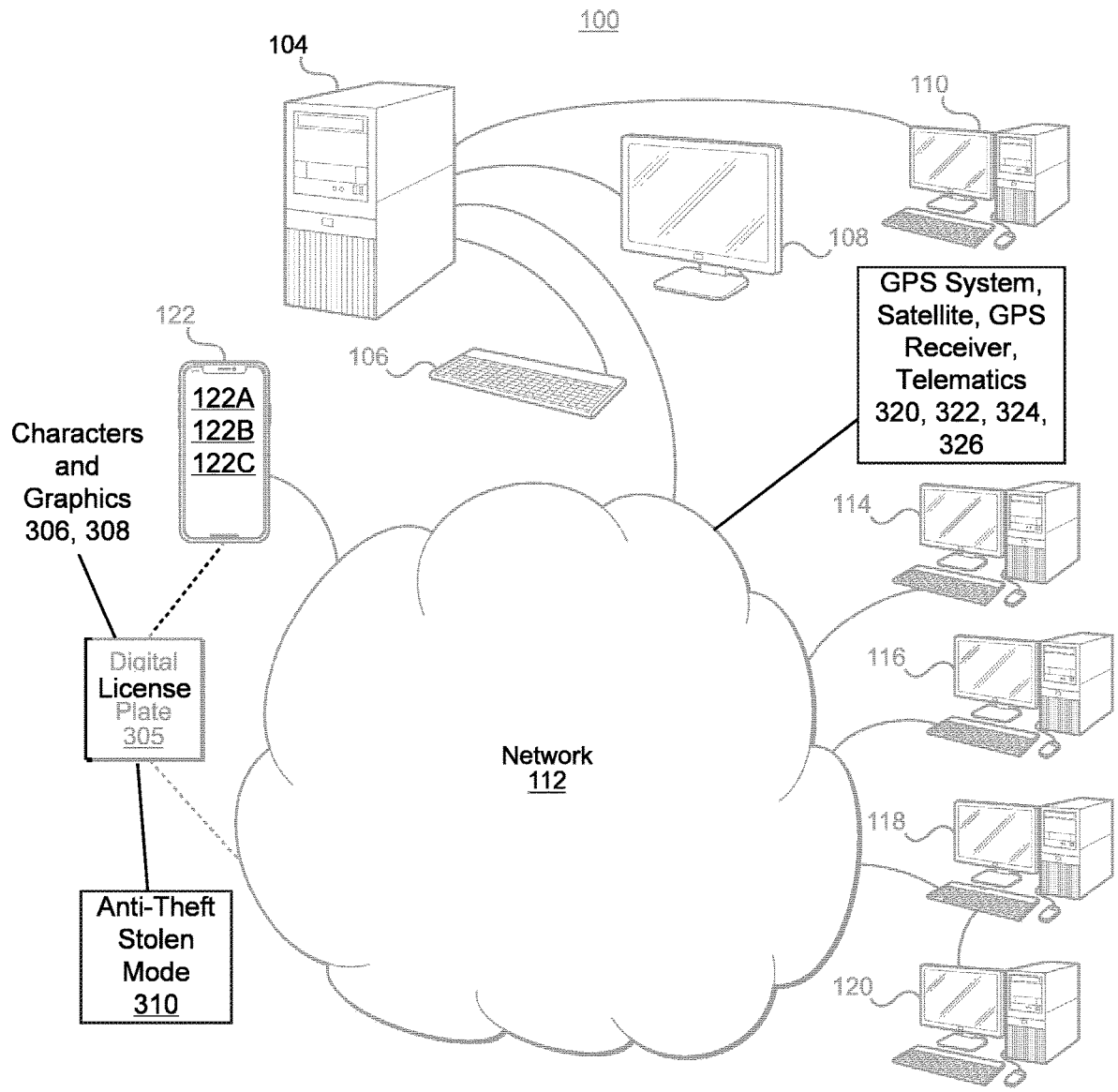
FIG. 1 shows a system overview of one embodiment of a digital tag tracking system.

Reference is made herein to the attached drawings. Like reference numerals are used throughout the drawings to depict like or similar elements of a digital tag tracking system. The figures are intended for representative purposes only and should not be considered to be limiting in any respect.

Referring now to FIG. 1 there is shown a system overview of a digital tag tracking system 100.

The digital tag tracking system 100 includes a server system 104, an input system 106, an output system 108, a plurality of client systems 110, 114, 116, 118 and 120, a communications network 112, and a hand-held device 122. In other embodiments, the digital tag tracking system 100 may include additional components and/or may not include all of the components listed above.

The server system 104 may include one or more servers. The server system 104 may be the property of the distributor of any related software or non-transitory storage media. In other embodiments, the digital tag tracking system 100 may include additional components and/or may not include all of the components listed above.

The input system 106 may be used for entering input into the server system 104, and may include any one of, some of, any combination of, or all of a keyboard system, a mouse system, a track ball system, a track pad system, a plurality of buttons on a handheld system, a scanner system, a wireless receiver, a microphone system, a connection to a sound system, and/or a connection and/or an interface system to a computer system, an intranet, and/or the Internet (i.e., IrDA, USB), for example.

The output system 108 may be used for receiving output from the server system 104, and may include any one of, some of, any combination of or all of a monitor system, a wireless transmitter, a handheld display system, a printer system, a speaker system, a connection or an interface system to a sound system, an interface system to one or more peripheral devices and/or a connection and/or an interface system to a computer system, an intranet, and/or the Internet, for example.

The digital tag tracking system 100 illustrates some of the variations of the manners of connecting to the server system 104, which may be an information providing website (not shown). The server system 104 may be directly connected and/or wirelessly connected to the plurality of client systems 110, 114, 116, 118 and 120 and are connected via the communications network 112. Client systems 120 may be connected to the server system 104 via the client system 118. The communications network 112 may be any one of, or any combination of, one or more local area networks or LANs, wide area networks or WANs, wireless networks, telephone networks, the Internet and/or other networks. The communications network 112 may include one or more wireless portals (not shown). The client systems 110, 114, 116, 118 and 120 are any system that an end user may use to access the server system 104. For example, the client systems 110, 114, 116, 118 and 120 may be personal computers, workstations, laptop computers, game consoles, handheld network enabled audio/video players and/or any other network appliance.

The client system 120 accesses the server system 104 via the combination of the communications network 112 and another system, which in this example is the client system 118. The client system 120 is an example of a handheld wireless device 122, such as a mobile phone or a handheld network enabled audio/music player or the like, which may also be used for accessing network content.

The handheld wireless device 122 may display a plurality of instant updates 122A, a panic mode 122B, and a roadside assist mode 122C that all reside on the non-transitory storage media for a digital tag tracking system 255.

The instant updates 122A may allow for real-time or near-real-time notifications and information provided to users or administrators regarding status, location, and activities of tagged assets, vehicles, or individuals. These updates may be accessed through a cell phone and may be remotely performed by local Department of Motor Vehicles or DMV or law enforcement. The panic mode 122B may allow a user to trigger an emergency alert or distress signal that is often used in scenarios where the person carrying the digital license plate 305 feels threatened or unsafe and needs immediate assistance. The roadside assist mode 122C may providing timely support and services to individuals who experience vehicle-related issues or emergencies while on the road.

The digital license plate 305 may include an anti-theft stolen mode module 310 and a Global Positioning System or GPS 320. The anti-theft stolen mode module 310 may enhance security and aid in the recovery of stolen items that are tagged with tracking devices which includes several functionalities to deter thieves, assist law enforcement, and increase the chances of retrieving stolen items. The anti-theft stolen mode module 310 may reside on the non-transitory storage media for a digital tag tracking system 255.

The instant updates 122A, the panic mode 122B, and the roadside assist mode 122C may also be accessed through the dispatch and call center computer (FIG. 8, 430) as well as the handheld wireless device 122.

A motorist may choose if they would like to share their "Panic, Roadside Assist, & Stolen" alerts with someone they know. The motorist is solely responsible for this feature and will have to sign a waiver. A 360-degree dash or inside roof top camera may be access doing this time of the listed alerts.

If you're a motor vehicle or digital license plate 305 is stolen, the digital license plate 305 will display "Stolen".

The GPS 320 may include a satellite 322, a GPS receiver 324, and a plurality of telematics 326.

Figure 8:
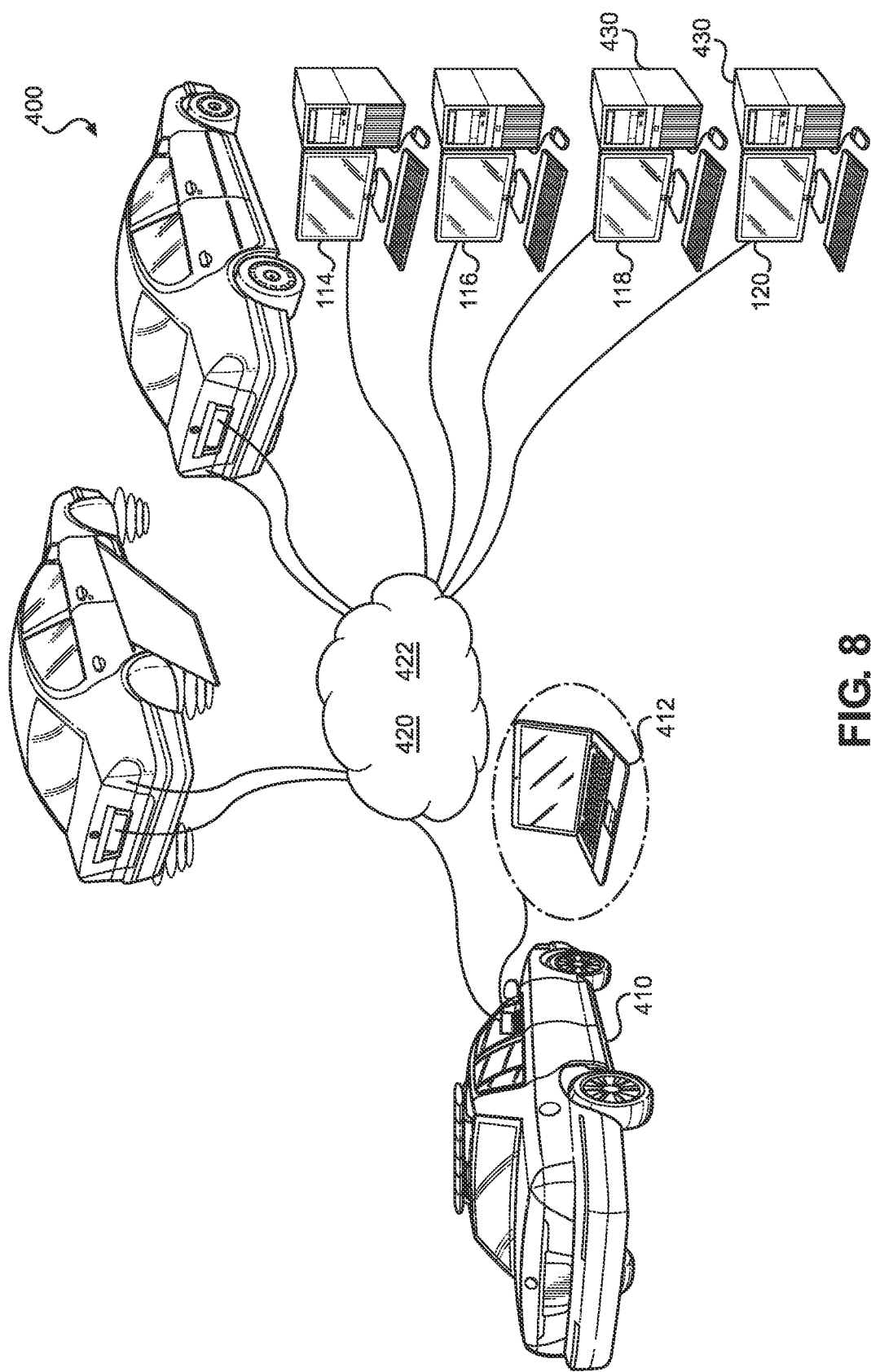
FIG. 8 shows a system overview of law enforcement and EMS usage of one embodiment of a digital tag tracking system.

The satellite 322 may continuously transmit signals about one or more positions and a current time and the like. The GPS receiver 324 may receive and emit signals back to the satellite and signals about one or more positions and the current time. The telematics 326 may involve collection, transmission, and analysis of data from remote sources, such as one or more vehicles, for various purposes such as tracking, monitoring, communication, and analysis. Telematics systems use a combination of technologies like Global Positioning System or GPS, cellular networks, sensors, and computing to enable communication between one or more vehicles (FIG. 8, 420), and a dispatch and call center computer (FIG. 8, 430).

The digital license plate 305 may display alphanumeric characters and graphics 306 or the like. The digital license plate 305 may replace a traditional license plate (not shown) that may be made of metal or the like and is discussed in greater detail in FIGS. 3-7. The digital license plate 305 may be waterproof and shatterproof and may come in a plurality of colors and logos 308 that may be customized. The logos 308 may be customized for each state, country, or commercial entity that wishes the digital license plate 305 to be used for marketing purposes or the like.

Figure 2A:
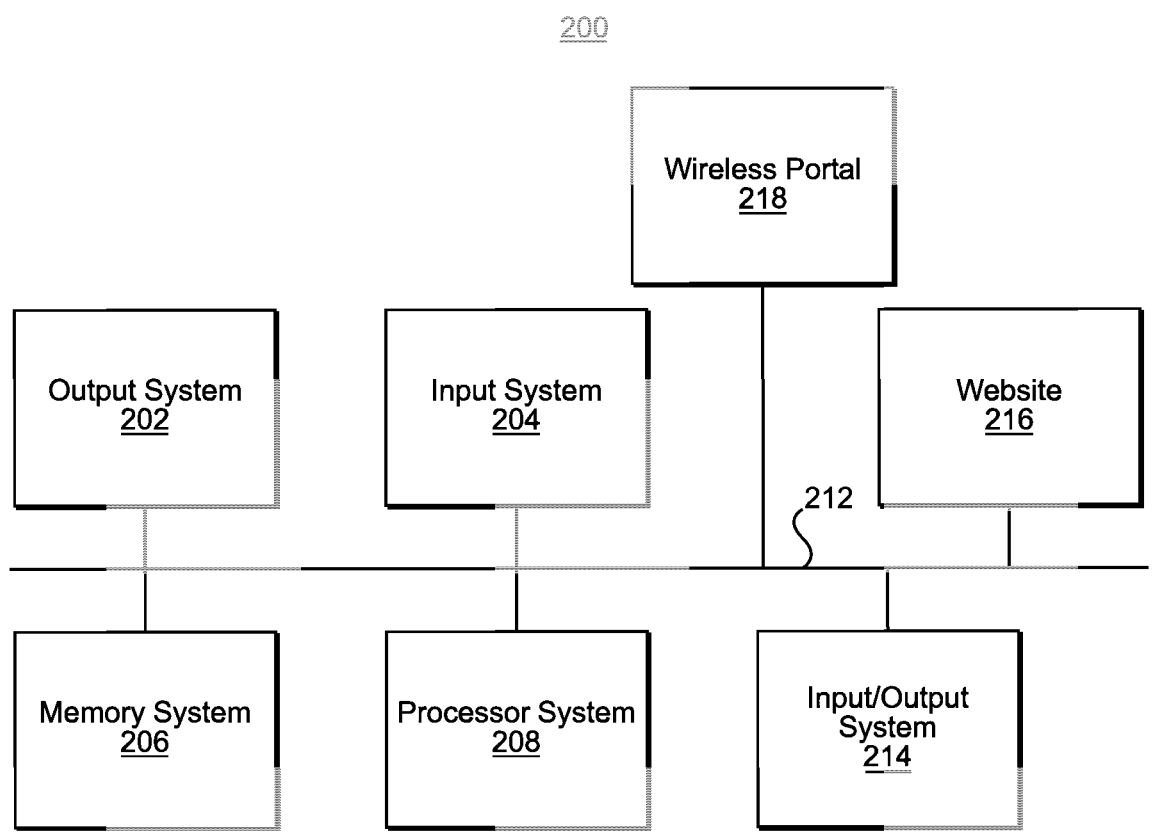
FIG. 2A shows a block diagram of a client system of a digital tag tracking system.

Referring now to FIG. 2A there is shown a block diagram of a client system 200 of the digital tag tracking system 100.

The client system 200 may include an output system 202, an input system 204, a memory system 206, a processor system 208, a communications system 212, an input/output system 214, a website 216 and a wireless portal 218. Other embodiments of the client system 200 may not have all of the components and/or may have other embodiments in addition to or instead of the components listed above.

The client system 200 may be any one of the client systems 110, 114, 116, 118, 120, and/or handheld wireless device 122 that may be used as one of the network devices of FIG. 1. In other embodiments, the client system 200 may include additional components and/or may not include all of the components listed above. The output system 202 may include any one of, some of, any combination of or all of a monitor system, a wireless transmitter, a handheld display system, a printer system, a speaker system, a connection or an interface system to a sound system, an interface system to peripheral devices and/or a connection and/or an interface system to a computer system, an intranet, and/or the Internet, for example.

Figure 2B:
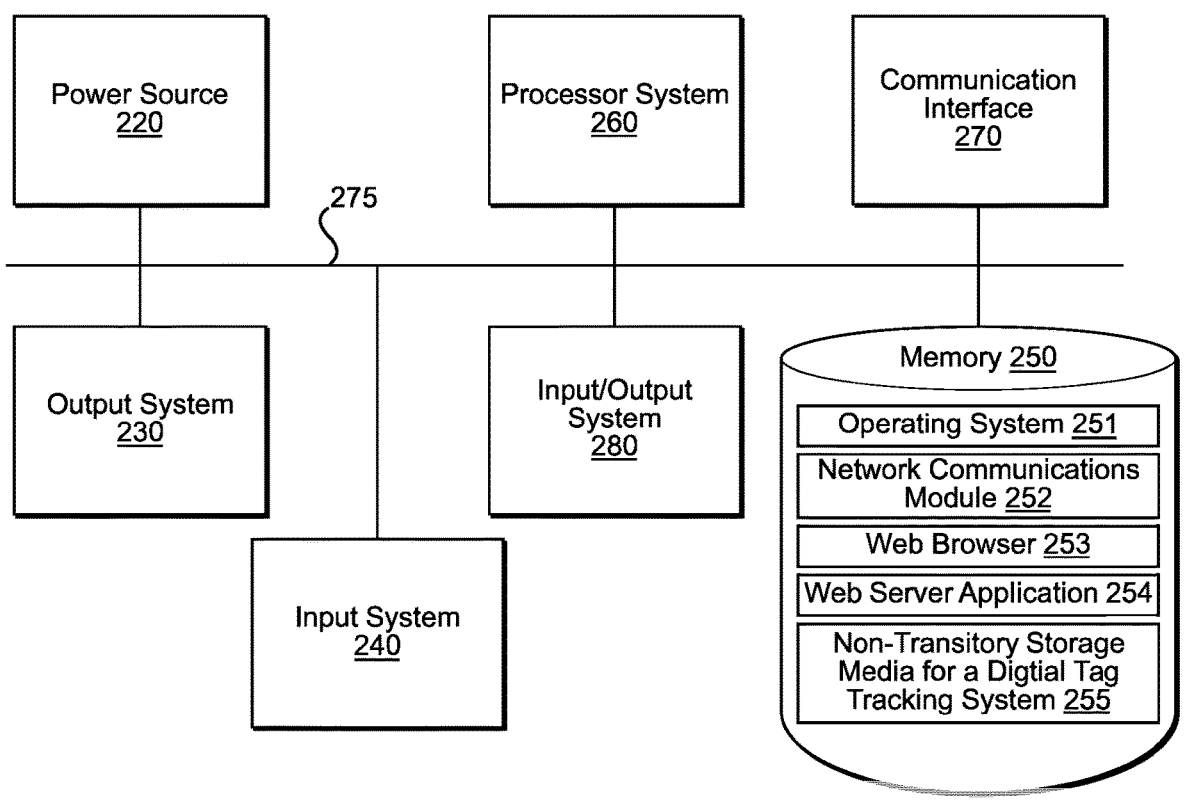
FIG. 2B illustrates a block diagram of a server system of a digital tag tracking system.

The input system 204 may include any one of some of, any combination of or all of a keyboard system, a mouse system, a track ball system, a track pad system, one or more buttons on a handheld system, a scanner system, a wireless receiver, a microphone system, a connection to a sound system, and/or a connection and/or an interface system to a computer system, an intranet, and/or the Internet (i.e., Infrared Data Association or IrDA, Universal Serial Bus or USB), for example. The memory system 206 may include, for example, any one of, some of, any combination of or all of a long-term storage system, such as a hard drive, a short-term storage system, such as a random-access memory; a removable storage system, such as a floppy drive or a removable drive, and/or a flash memory. The memory system 206 may include one or more machine-readable mediums that may store a variety of different types of information. The term machine-readable medium is used to refer to any medium that is structurally configured for carrying information in a format that is readable by a machine. One example of a machine-readable medium is a computer-readable medium. The memory system 206 also stores a non-transitory storage media for a digital tag tracking system (FIG. 2B, 255).

The processor system 208 may include any one of, some of, any combination of, or all of multiple parallel processors, a single processor, a system of processors having one or more central processors and/or one or more specialized processors dedicated to specific tasks. The processor system 208 implements the programs stored in the memory system 206. The communications system 212 communicatively buttons the output system 202, the input system 204, the memory system 206, the processor system 208, and/or the input/output system 214 to each other. The communications system 212 may include any one of, some of, any combination of, or all of one or more electrical cables, fiber optic cables, and/or means for sending signals through air or water (i.e., wireless communications), or the like. Some examples of means for sending signals through air and/or water include systems for transmitting electromagnetic waves such as infrared and/or radio waves and/or systems for sending sound waves.

The input/output system 214 may include devices that have the dual function as input and output devices. For example, the input/output system 214 may include one or more touch sensitive screens, which display an image and therefore are an output device and accept input when the screens are pressed by a finger or a stylus, for example. The touch sensitive screens may be sensitive to heat, capacitance and/or pressure. One or more of the input/output devices may be sensitive to a voltage or a current produced by a stylus, for example. The input/output system 214 is optional and may be used in addition to or in place of the output system 202 and/or the input device 204.

The client systems 110, 114, 116, 118, 120 and the handheld wireless device 122 may also be tied into a website 216 or a wireless portal 218 which is also tied directly into the communications system 212. Any website 216 or wireless portal 218 would also include software and a website module (no number) to maintain, allow access to and run the website as well.

FIG. 2B shows a block diagram of a server system 104 of the digital tag tracking system 100.

The server system 104 may include a power source 220, an output system 230, an input system 240, a memory system 250, which may store an operating system 251, a communications module 252, a web browser module 253, a web server application 254, and a non-transitory storage media for a digital tag tracking system 255. The server system 104 may also include a processor system 260, a communications interface 270, a communications system 275 and an input/output system 280. In other embodiments, the server system 104 may include additional components and/or may not include all of the components listed above.

The output system 230 may include any one of, some of, any combination of, or all of a monitor system, a handheld display system, a printer system, a speaker system, a connection or interface system to a sound system, an interface system to one or more peripheral devices and/or a connection and/or interface system to a computer system, an intranet, and/or the Internet, for example.

The input system 240 may include any one of, some of, any combination of, or all of a keyboard system, a mouse system, a track ball system, a track pad system, one or more buttons on a handheld system, a scanner system, a microphone system, a connection to a sound system, and/or a connection and/or an interface system to a computer system, an intranet, and/or the Internet (i.e., IrDA, USB), for example.

The memory system 250 may include, for example, any one of, some of, any combination of, or all of a long-term storage system, such as a hard drive; a short-term storage system, such as random-access memory; a removable storage system, such as a floppy drive or a removable drive and/or a flash memory. The memory system 250 may include one or more machine-readable mediums that may store a variety of different types of information. The term machine-readable medium is used to refer to any medium capable of carrying information that is readable by a machine. One example of a machine-readable medium is a computer-readable medium. The memory system 250 may store one or more machine instructions for reading, searching, and enhancing a digital tag tracking system. The operating system 251 controls all software or non-transitory storage media and hardware of the digital tag tracking system 100. The communications module 252 may enable the server system 104 to communicate on the communications network 112. The web browser module 253 allows for browsing the Internet. The web server application 254 serves a plurality of web pages to client systems that request the webpages, thereby facilitating browsing on the Internet.

The processor system 260 may include any one of, some of, any combination of, or all of multiple parallel processors, a single processor, a system of processors having one or more central processors and/or one or more specialized processors dedicated to specific tasks. The processor system 260 may implement the machine instructions stored in the memory system 250.

In an alternative embodiment, the communication interface 270 allows the server system 104 to interface with the communications network 112. In this embodiment, the output system 230 sends communications to the communication interface 270. The communications system 275 communicatively buttons the output system 230, the input system 240, the memory system 250, the processor system 260 and/or the input/output system 280 to each other. The communications system 275 may include any one of, some of, any combination of, or all of one or more electrical cables, fiber optic cables, and/or sending signals through air or water (i.e., wireless communications), or the like. Some examples of sending signals through air and/or water include systems for transmitting electromagnetic waves such as infrared and/or radio waves and/or systems for sending sound waves.

The input/output system 280 may include devices that have the dual function as the input and output devices. For example, the input/output system 280 may include one or more touch sensitive screens, which display an image and therefore are an output device and accept input when the screens are pressed by a finger or a stylus, for example. The touch sensitive screens may be sensitive to heat and/or pressure. One or more of the input/output devices may be sensitive to a voltage or a current produced by a stylus, for example. The input/output system 280 is optional and may be used in addition to or in place of the output system 230 and/or the input device 240.

Figure 3:
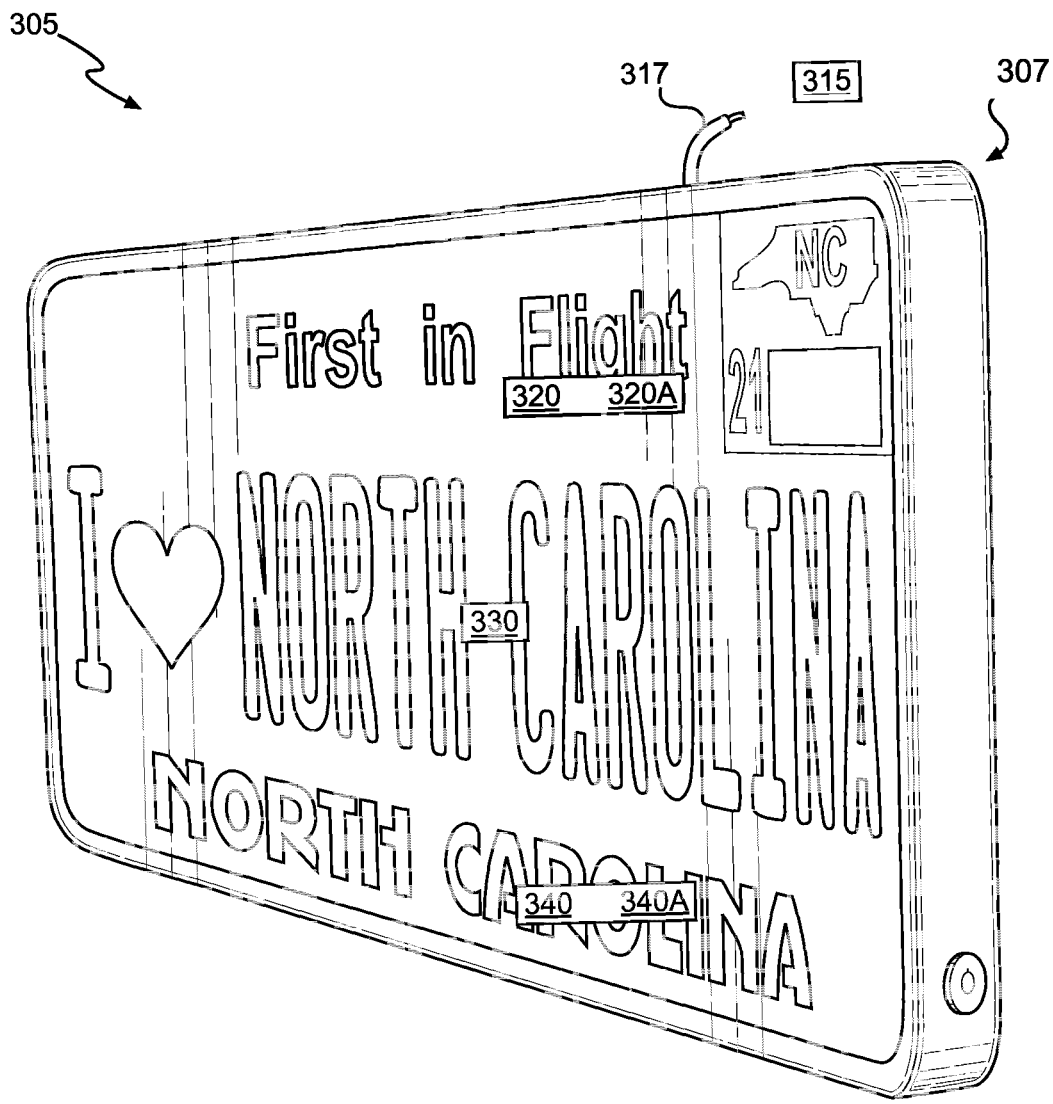
FIG. 3 shows a front perspective view of one embodiment of a digital license plate.

FIG. 3 shows a front perspective view of one embodiment of a digital license plate 305.

The digital license plate 305 may include an encasement 307, an electrophoretic display 320, a front covering 330, and an electrical power source 340.

The encasement 307 may be made of a plastic material or the like. The electrophoretic display 320 may be encased within the encasement 307 for protection and security. The electrophoretic display 320 or electronic paper or e-paper display may have low power consumption, high contrast, and wide viewing angles relative to other digital displays. The front covering 330 may be disposed on the front half (FIG. 5, 310A) of the encasement 307 to protect a front facing 320A of the electrophoretic display 320. The electrical power source 340 may be a built-in rechargeable battery 340A or the like, which would need to be recharged periodically, or by integrating the digital license plate 305 with a vehicle's electrical system 315 via a wire 317 or the like.

The digital license plate 305 may be in operable communication with a server system (FIG. 1, 104). The server system 104 may store a plurality of driver profile information that may reside on the non-transitory storage media for a digital tag tracking system 255, wherein the digital license plate 305 is configured to display automated updates.

The digital license plate 305 may be made of a flexible and shatterproof material. The digital license plate 305 may be configured to display information in multiple colors which may be customized to resemble each respective state's original license plate colorings. The digital license plate 305 may be a combination of E-Ink and plastic material or the like. Furthermore, the digital license plate 305 may also be configured to display advertisements or personalized messaging. The digital license plate 305 may be a vanity plate or the like and may be able to customize and display any desired messages and logos, such as "I Love North Carolina", "Sweet Home Alabama", "First in Flight" or the like. The digital license plate 305 may display any logos, pictures, or any color that is desired.

Figure 4A:
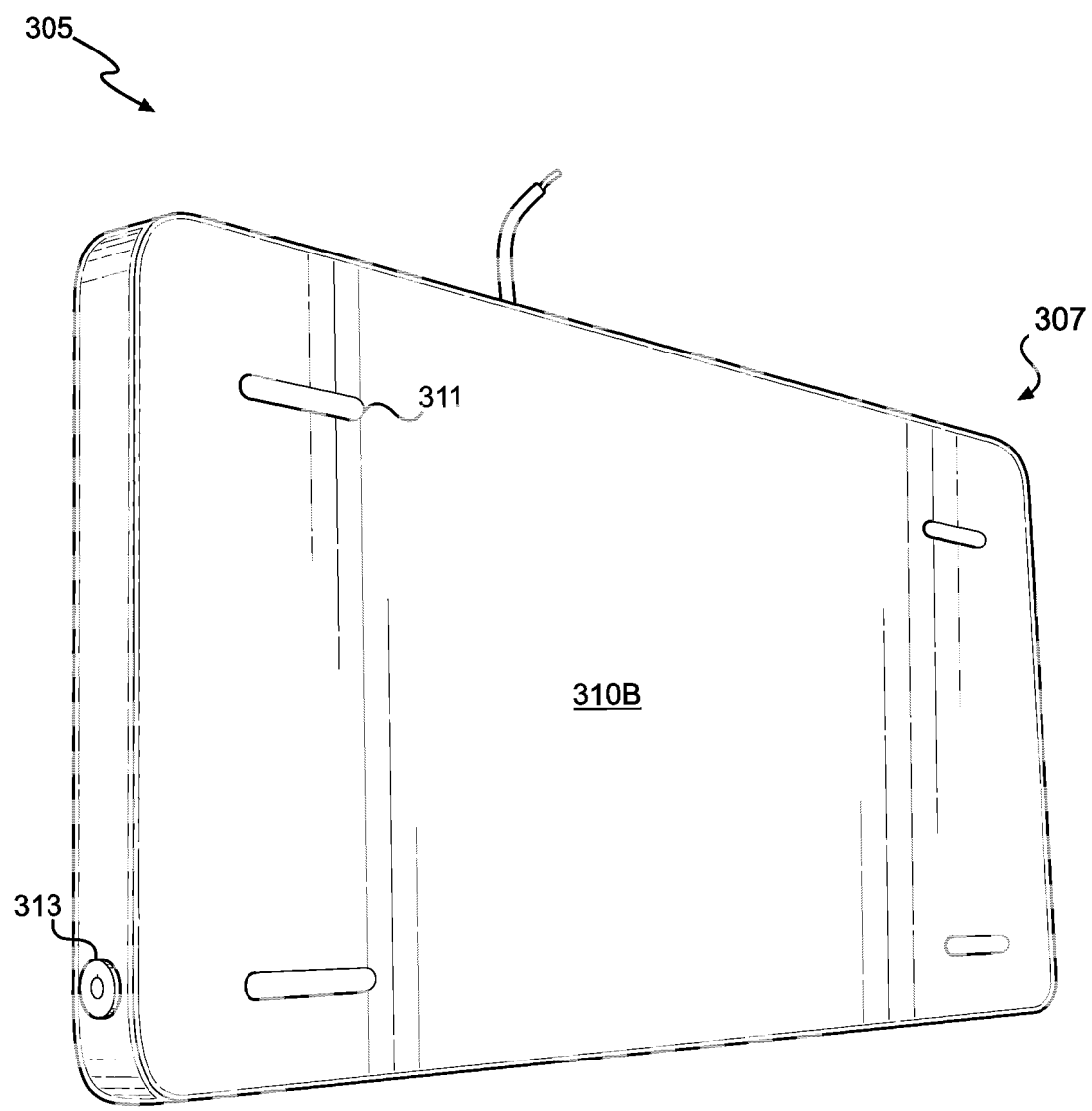
FIG. 4A shows a rear perspective view of one embodiment of a digital license plate.

FIG. 4A shows a rear perspective view of one embodiment of a digital license plate 305.

The digital license plate 305 may include the rear half (FIG. 5, 310B) of the encasement 307 having a plurality of attachment slots 311 that may receive a corresponding plurality of attachment protrusions or fasteners (not shown) to couple the digital license plate 305 to a vehicle (not shown). The digital license plate 305 may include a button 313 disposed on an outer edge 310C of the encasement 307 that may be depressed to separate the front half (FIG. 5, 310A) of the encasement 307 to the rear half 310B of the encasement 307 to insert the electrophoretic display (FIG. 3, 320) between the front half 310A of the encasement 307 to the rear half 310B of the encasement 307.

Figure 4B:
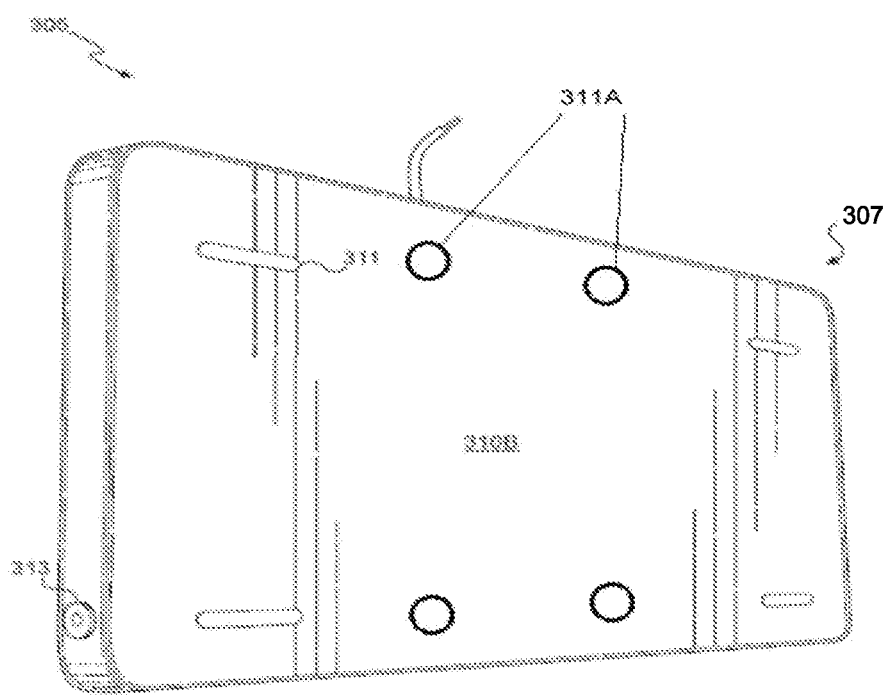
FIG. 4B shows a rear perspective view of one embodiment of a digital license plate.

FIG. 4B shows a rear perspective view of one embodiment of a digital license plate 305.

The digital license plate 305 may include the rear half (FIG. 5, 310B) of the encasement 307 having a plurality of mounting holes 311A that may receive a corresponding plurality of attachment protrusions or fasteners (not shown) to couple the digital license plate 305 to a vehicle (not shown).

Figure 5:
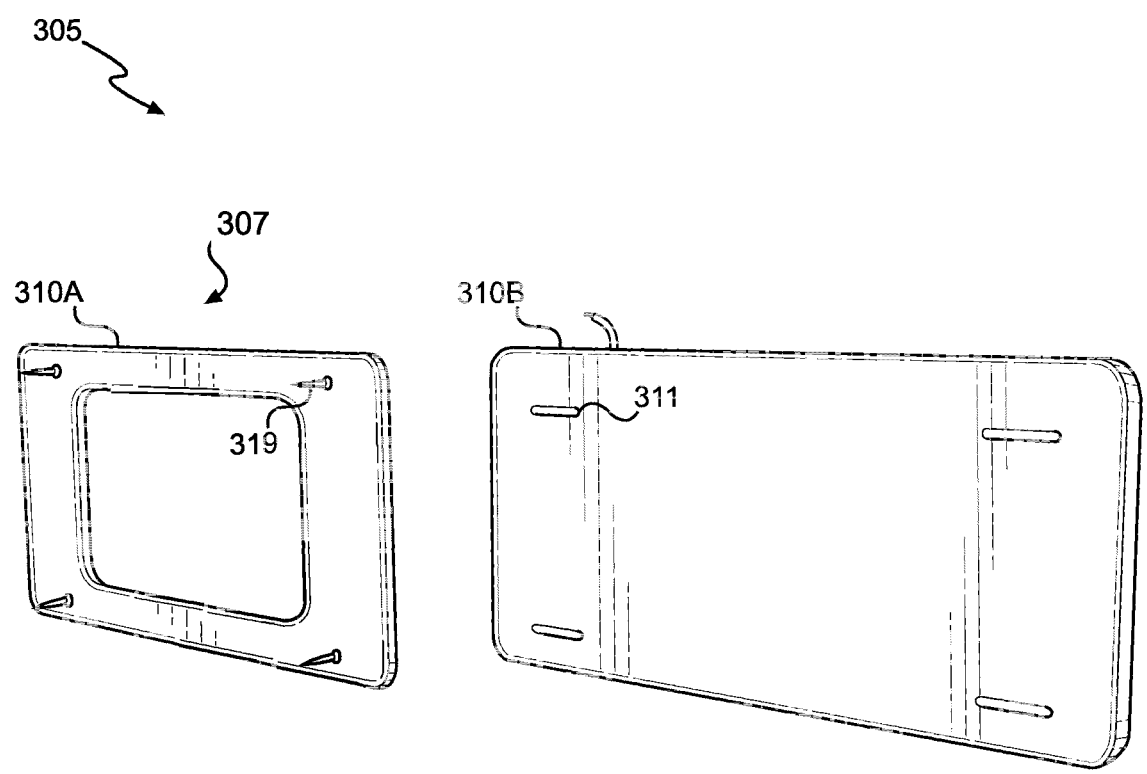
FIG. 5 shows an exploded perspective view of one embodiment of a digital license plate.

FIG. 5 shows an exploded perspective view of one embodiment of a digital license plate 305.

The digital license plate 305 may include the rear half 310B of the encasement 307 having the attachment slots 311 and a plurality of fasteners 319.

The attachment slots 311 may couple the digital license plate 305 to a vehicle by receiving a plurality of other fasteners (not shown). The fasteners 319 may be disposed on the inner corners of the front half 310A of the encasement 307 to removably secure the front half 310A of the encasement 307 to the rear half 310B of the encasement 307.

Figure 6:
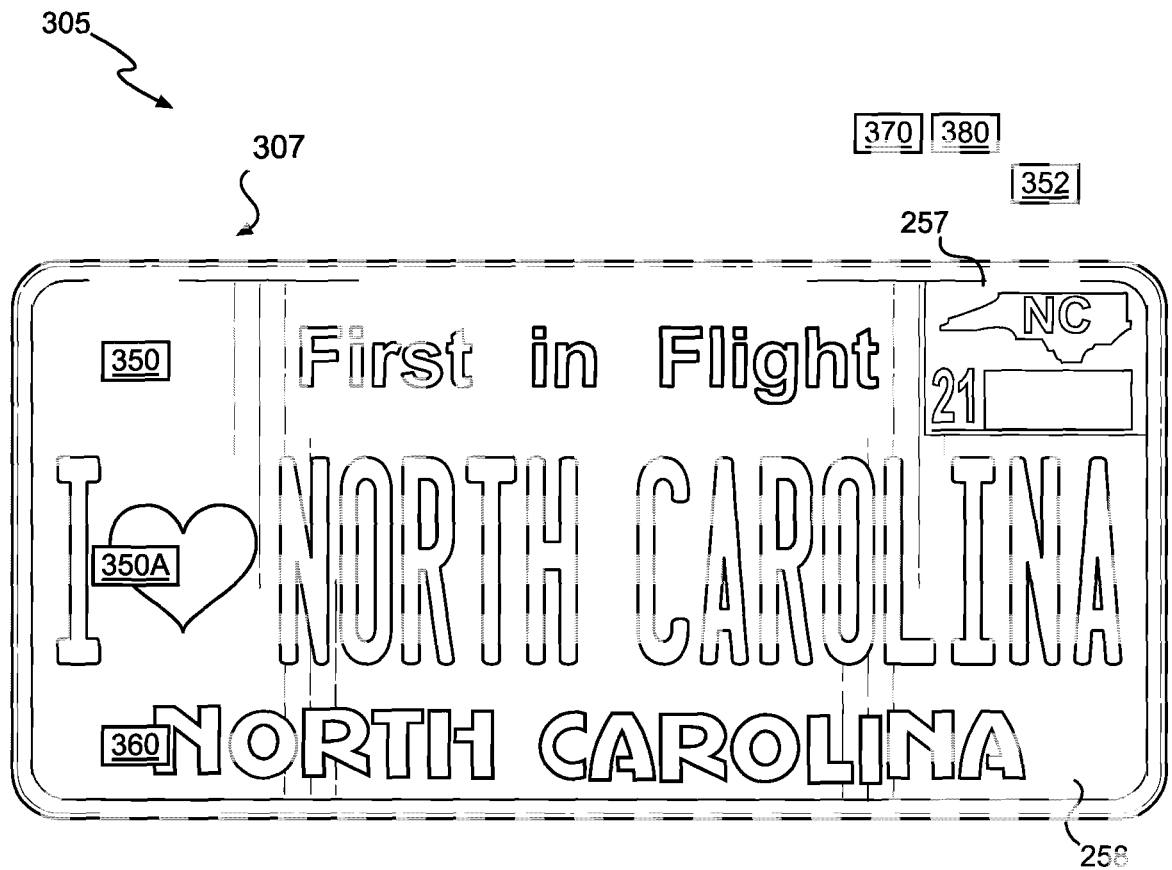
FIG. 6 shows a front view of one embodiment of a digital license plate.

Referring now to FIG. 6, there is shown a front view of a digital license plate 305.

The digital license plate 305 may include the driver profile information, a plurality of radio frequency identification or RFID tags 350, a global positioning system or GPS receiver 360, a centralized tracking system 370, and a plurality of security features 380.

The driver profile information may display a current registration decal 257 and information in a style that mimics traditional license plates 258. FIG. 6 shows the style that mimics a traditional license plate 258 from the State of North Carolina.

The radio frequency identification or RFID tags 350 may be equipped on the digital license plate 305. The RFID tags 350 may have an adhesive backing, may be placed within the encasement 307, or may be attached to the digital license plate 305 with a tamper-proof fastener 350A that fastens the RFID tags 350 to the encasement 307. The RFID tags 350 may communicate with a plurality of RFID readers 352 installed at various external locations, such as toll booths, parking lots, checkpoints, or the like. The RFID readers 352 may read a unique identifier associated with the digital license plate 305 and transmit it to the centralized tracking system 370.

The GPS receiver 360 may be integrated into the digital license plate 305 to provide real-time location tracking. The GPS receiver 360 may determine a vehicle's precise geographical coordinates, which may be transmitted to the centralized tracking system 370 to enable authorities or vehicle owners to track a vehicle's movements.

The centralized tracking system 370 may receive and process data from the digital license plates 305. The centralized tracking system 370 may store and manage information related to each of the digital license plates 305 associated with the digital tag tracking system 100, such as vehicle registration details, owner information, and location history on the non-transitory storage media for a digital tag tracking system 255. The centralized tracking system 370 may handle requests from authorized users to update or retrieve information about a specific digital license plate 305 and retrieve and add information to the non-transitory storage media for a digital tag tracking system 255. The centralized tracking system 370 may include instant updates on a driver's profile information, a plurality of registration sticker and decal information, a plurality of plate number information, and a plurality of state logo information and any related images or the like.

The centralized tracking system 370 may reside on the server system (FIG. 1, 104) and store the driver profile information about registered vehicles, owners, and license plate associations on the non-transitory storage media for a digital tag tracking system 255. The centralized tracking system 370 may perform license plate lookups and support various operations related to tracking and identification and retrieve and add information to the driver profile information residing on the non-transitory storage media for a digital tag tracking system 255.

The driver profile information may include data analytics capabilities to analyze the collected information. This could involve generating reports on vehicle movements, traffic patterns, or identifying suspicious activities based on predefined rules or algorithms. The data analytics component would provide valuable insights to law enforcement agencies, transportation authorities, or other relevant parties.

The security features 380 may ensure integrity and privacy of the digital tag tracking system 100. The security features 380 may include encryption of data transmission between the digital license plate 305, the cellphone interface 390, and the centralized tracking system 370, access controls to restrict unauthorized access to the digital tag tracking system 100, and secure storage of the driver profile information on the non-transitory storage media for a digital tag tracking system 255.

The driver profile information location data may be further transmitted and queried based on tracking systems installed within the digital license plate 305 utilizing the RFID tags 350 and the GPS receiver 360. The RFID tags 350 and the GPS receiver 360 allows law enforcement to instantly query the driver profile information on the server system (FIG. 1, 104) to locate the position of the vehicle associated with the driver described in the driver profile information. Law enforcement may further utilize the driver profile information to broadcast a signal and display a notification if a vehicle is stolen, or in the event of a child abduction.

The digital tag tracking system 100 may also be utilized in Panic Mode allowing a driver to signal for help in the event of an emergency such as a car crash. The digital tag tracking system 100 may further include a Neutral Mode to be utilized when a driver needs standard roadside assistance, such as for a flat tire or the like.

The digital tag tracking system 100 may include a dispatch coordinator that will know how to prioritize calls depending on which mode is detected from the driver. Optionally, a plurality of cameras may be included as part of the digital tag tracking system 100 as an additional safety feature if the driver chooses to do so. The cameras may maintain a plurality of video data on the non-transitory storage media for a digital tag tracking system 100 for legal purposes or the like.

The centralized tracking system 370 may be utilized by any law enforcement agent/officer to query data remotely from a dispatch center or directly from a license plate itself. This data includes the driver's profile information, the driver's registration information, a plurality of the driver's auto insurance information, a plurality of medical records (optional for a motorist due to the HIPPA Act), a plurality of firearms training academy or FTA information, a plurality of conceal weapons information, a plurality of an electronic toll collection system or EZ-PASS® information, a plurality of toll road membership information, or any potential alerts or warnings regarding the driver. The vehicle may also be tracked and triangulated through Geostationary Earth Orbit or GEO Fence and Global Positioning System or GPS technology or the like. Vehicles may also be identified by any checkpoint including a military checkpoint or the like.

The centralized tracking system 370 may include America's Missing: Broadcast Emergency Response or AMBER alerts which may indicate "Stolen", "Kidnapped", or "Uninsured" or the like.

Figure 7:
FIG. 7 shows a front view of one embodiment of a digital license plate showing a cellphone interface.

The Referring now to FIG. 7, there is shown a front view of the digital license plate 305 showing a cellphone interface 390.

The cellphone interface 390 may reside on the handheld wireless device (FIG. 1, 122) or other client system (FIG. 2A, 200). The cellphone interface 390 may be in communication with the digital license plate 305 via the communications network 112 or a wireless communication technology or BLUETOOTH® technology (FIG. 1, 125).

FIG. 8 shows a system overview of law enforcement and Emergency Medical Services or EMS usage of one embodiment of a digital tag tracking system 400.

The digital tag tracking system 400 may include a law enforcement and EMS vehicle 410, one or more vehicles 420, and a dispatch and call center computer 430.

The law enforcement and EMS vehicle 410 may include a Subscriber Identity Module or SIM card 412. The one or more vehicles 420 may be a one or more passenger vehicles 422 or the like that has the digital license plate 305 disposed on each of the one or more passenger vehicles 422. The dispatch and call center computer 430 may control the instant transmission between the law enforcement and EMS vehicle 410 and the one or more passenger vehicles 422. The dispatch and call center computer 430 may utilize the server system (FIG. 1, 104) of the digital tag tracking system 400.

The law enforcement and EMS vehicle 410 may include instant data transmission to use a patrol vehicle's laptop 412 hands-on or hands-free through voice recognition software to track and triangulate a traffic violators' location. The patrol vehicle's laptop 412 may communicate directly with the law enforcement and EMS vehicle 410 and dispatch coordinators at a call center. The patrol vehicle's laptop 412 may have a Subscriber Identity Module or SIM card installed for cellular communication. The digital license plate 305 may also be used for tracking flying cars and the like.

Figure 9:
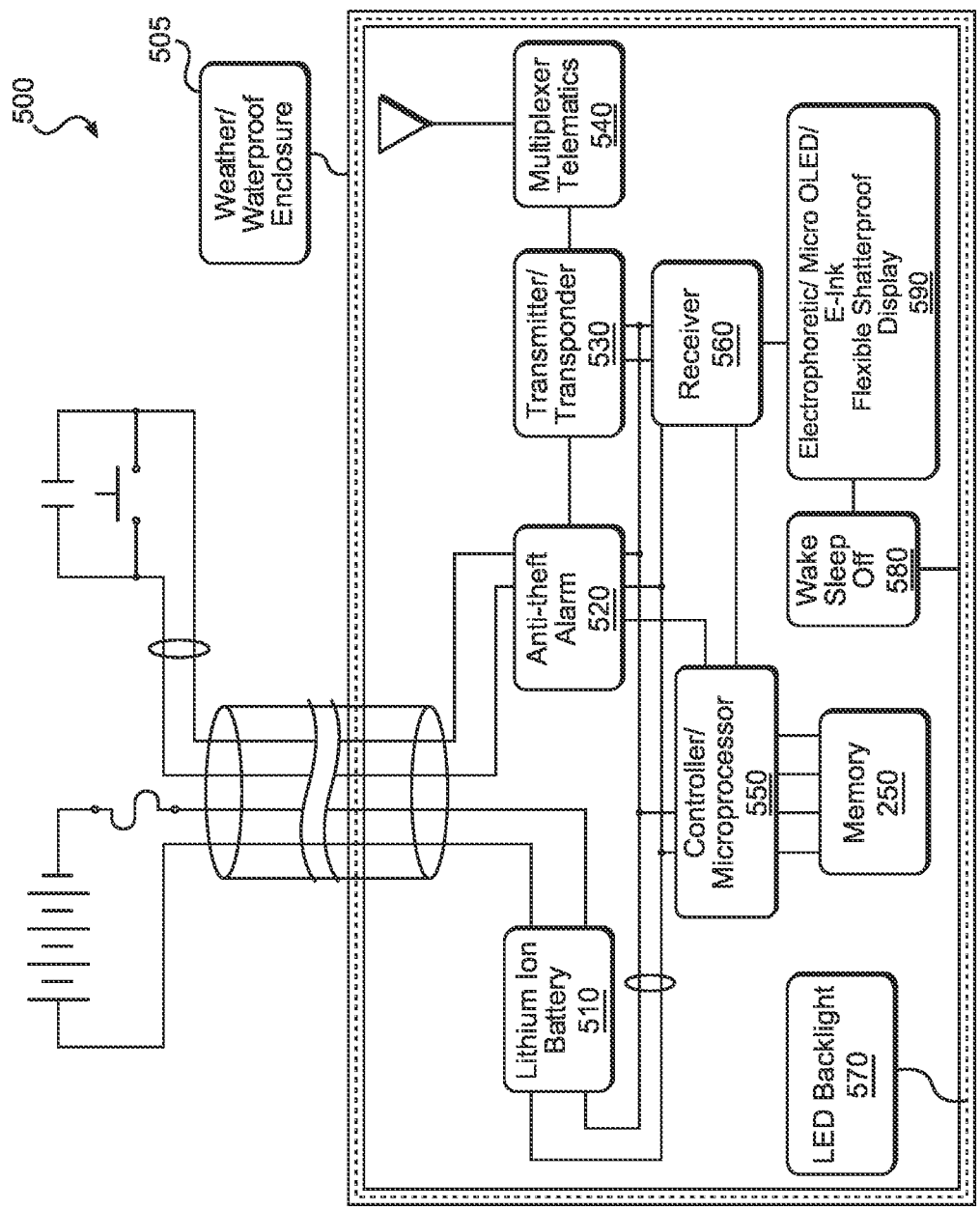
FIG. 9 shows an electrical diagram of one embodiment of a digital tag tracking system.

FIG. 9 shows an electrical diagram 500 of one embodiment of a digital tag tracking system 100. The components of the electrical diagram 500 may be contained in an enclosure 505 that is weatherproof and waterproof and is part of the server system (FIG. 1, 104) of the digital tag tracking system 100.

The electrical diagram 500 may include a lithium-ion battery 510, an anti-theft alarm 520, a transmitter/transponder 530, a telematics multiplexer 540, a controller/microprocessor 550, a receiver 560, a Light Emitting Diode or LED backlight 570, a wake/sleep off alarm 580, and a display 590.

The lithium-ion battery 510 may have a higher energy density, a longer cycle life, a lower self-discharge rate, a faster charging rate, and a wider range of applications than other types of batteries. The anti-theft alarm 520 may be part of the anti-theft stolen mode module (FIG. 1, 310) that may provide timely support and services to individuals who experience vehicle-related issues or emergencies while on the road. The transmitter/transponder 530 may allow the digital tag tracking system 100 to communicate, track, and gather information from the digital license plate 305. It enables the digital license plate 305 to interact with the digital tag tracking system 100 by sending and receiving signals, which are then used to determine the digital license plate 305 location, status, and other relevant data. The telematics multiplexer 540 may combine a plurality of data streams from the law enforcement and EMS vehicle 410 and transmit them over a single communication channel. The controller/microprocessor 550 may be the processor system (FIG. 2B, 260) to manage the operation of the digital license plate 305 to process data, and execute the necessary tasks to enable tracking, communication, and other functionalities. The controller/microprocessor 550 may also include the memory system (FIG. 2B, 250). The receiver 560 may pick-up signals transmitted by the digital license plate 305 attached to the one or more vehicles 420. The receiver 560 plays a crucial role in communication between the digital license plate 305 and the digital tag tracking system 100, allowing the digital tag tracking system 100 to collect data, monitor locations, and manage the one or more vehicles 420 that have the digital license plate 305. The LED backlight 570 may provide illumination to the digital license plate 305 disposed on the one or more vehicles 420, making the content on the digital license plate 305 visible, especially in low-light conditions. The wake/sleep off alarm 580 may pertain to activating or deactivating tracking functionality of the digital license plate 305 based on specific conditions or events to conserve battery life, optimize data collection, and manage resources efficiently. The display 590 may be selected from the group consisting of an electrophoretic display, a micro-Organic Light Emitting Diode or OLED display, an e-ink display, or a flexible shatterproof display or the like.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, to thereby enable others skilled in the art to best utilize the present invention and various embodiments with various modifications as are suited to the particular use contemplated.

It is therefore submitted that the present invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. A digital tag tracking system, comprising:
a server system with a processor system, a communications interface, a communications system, an input system and an output system, the server system having access to a communications network;
a memory system with an operating system, a communications module, a web browser module, a web server application, and a non-transitory storage media for a digital tag tracking system, the memory system is in communication with the server system through the communications network; and
a digital license plate in operable communication with the server system;
wherein the server system stores a plurality of driver profile information that resides on the non-transitory storage media for a digital tag tracking system;
further comprising a client system that accesses the server system via the communications network;
wherein the client system displays a plurality of instant updates, a panic mode, and a roadside assist mode that all reside on the non-transitory storage media for a digital tag tracking system;
a plurality of RFID tags equipped on the digital license plate that communicate with a plurality of RFID readers installed at various external locations;
wherein the RFID tags have an adhesive backing with a tamper-proof fastener that fastens the RFID tags to the encasement; and
a wake/sleep off alarm pertaining to tracking functionality of the digital license plate based on specific conditions or events to conserve battery life, optimize data collection, and manage resources efficiently.

2. The digital tag tracking system according to claim 1, wherein the smart phone includes a cellphone interface in communication with the digital license plate via a Bluetooth wireless communication technology.

3. The digital tag tracking system according to claim 1, wherein the digital license plate includes an encasement, an electrophoretic display, a front covering, an electrical power source, a GPS receiver, a centralized tracking system, a plurality of security features, an anti-theft stolen mode module, a Global Positioning System, an anti-theft alarm, a transmitter/transponder, a telematics multiplexer, a controller/microprocessor, a receiver, an Light Emitting Diode or LED backlight, a micro Organic Light Emitting Diode display, an Organic Light Emitting Diode display, or an e-ink display.

4. The digital tag tracking system according to claim 3, wherein the encasement includes a front half and a rear half that are coupled together to form the encasement.

5. The digital tag tracking system according to claim 4, wherein the rear half of the encasement includes a plurality of attachment slots adapted to couple the digital license plate to a vehicle.

6. The digital tag tracking system according to claim 4, further comprising a plurality of fasteners disposed on a plurality of inner corners of the front half of the encasement to removably secure the front half of the encasement to the rear half of the encasement.

7. The digital tag tracking system according to claim 3, wherein the electrophoretic display is encased within the encasement for protection and security.

8. The digital tag tracking system according to claim 3, wherein the electrical power source is a built-in rechargeable battery lithium-ion battery.

9. The digital tag tracking system according to claim 3, wherein the electrical power source is a wire adapted to come from a vehicle's electrical system.

10. The digital tag tracking system according to claim 3, wherein the GPS receiver is integrated into the digital license plate to provide real-time location tracking and to determine a vehicle's precise geographical coordinates, which are transmitted to the centralized tracking system adapted to enable authorities or vehicle owners to track a vehicle's movements.

11. The digital tag tracking system according to claim 3, wherein the centralized tracking system receives and processes data from the digital license plates and stores and manages information related to each of the digital license plates associated with the digital tag tracking system.

12. The digital tag tracking system according to claim 3, wherein the centralized tracking system resides on the server system and stores the driver profile information on the non-transitory storage media for the digital tag tracking system.

13. The digital tag tracking system according to claim 3, wherein the security features ensure integrity and privacy of the digital tag tracking system that include encryption of data transmission between the digital license plate, the cellphone interface, and the centralized tracking system.

14. The digital tag tracking system according to claim 3, wherein the security features restrict unauthorized access to the digital tag tracking system and secure storage of the driver profile information on the non-transitory storage media for a digital tag tracking system.

15. The digital tag tracking system according to claim 3, wherein the digital license plate is made of a flexible and shatterproof material in a plurality of colors and logos that are customized for each state, country, or commercial entity that uses the digital license plate for marketing purposes.

16. The digital tag tracking system according to claim 1, further comprising a law enforcement and EMS vehicle, one or more vehicles, and a dispatch and call center computer.

\* \* \* \* \*